(12) United States Patent
Joshi et al.

(10) Patent No.: US 11,787,700 B2
(45) Date of Patent: Oct. 17, 2023

(54) METHOD FOR FORMING INSOLUBLE SOLUTE ADDUCTS USING AN ACIDIC MEDIUM

(71) Applicant: CRYSTAPHASE PRODUCTS, INC., Houston, TX (US)

(72) Inventors: Umakant Pravinchandra Joshi, Spring, TX (US); Austin Schneider, Humble, TX (US); Bradley Glover, Houston, TX (US); John N. Glover, Houston, TX (US); Jeffrey Scott Oliver, Houston, TX (US); Krishna K. Rao, The Woodlands, TX (US)

(73) Assignee: CRYSTAPHASE PRODUCTS, INC., Houston, TX (US)

( * ) Notice: Subject to any disclaimer, the term of this patent is extended or adjusted under 35 U.S.C. 154(b) by 0 days.

(21) Appl. No.: 17/991,409

(22) Filed: Nov. 21, 2022

(65) Prior Publication Data
US 2023/0159344 A1    May 25, 2023

Related U.S. Application Data

(60) Provisional application No. 63/281,523, filed on Nov. 19, 2021.

(51) Int. Cl.
*C01D 5/16* (2006.01)

(52) U.S. Cl.
CPC ..................................... *C01D 5/16* (2013.01)

(58) Field of Classification Search
CPC ... C01D 5/16; C01D 5/00; C01D 9/00; C01D 13/00; C01F 11/00; C01F 11/46; C01G 9/00; C01G 25/00; C01B 9/00; C01B 25/265; C01B 25/30; C01B 25/32
See application file for complete search history.

(56) References Cited

U.S. PATENT DOCUMENTS

| | | | | |
|---|---|---|---|---|
| 3,931,416 A | * | 1/1976 | Grams | A23K 20/26 |
| | | | | 426/465 |
| 4,167,406 A | * | 9/1979 | Hauschild | C05B 13/02 |
| | | | | 423/313 |

FOREIGN PATENT DOCUMENTS

| | | | |
|---|---|---|---|
| CN | 107 523 383 A | * | 12/2017 |
| DE | 33 26 796 C1 | * | 11/1984 |
| JP | 52 122 566 A | * | 10/1977 |
| RU | 2 395 303 C1 | * | 7/2010 |

OTHER PUBLICATIONS

Kesic, Zeljka et al.: Calcium Oxide Based Catalysts for Biodiesel Production: a Review; Chemical Industry & Chemical Engineering Quarterly; pp. 391-408; 2016.

* cited by examiner

*Primary Examiner* — Timothy C Vanoy
(74) *Attorney, Agent, or Firm* — Greenberg Traurig LLP

(57) ABSTRACT

A method for forming an insoluble adduct using an acidic medium is provided. A chemical process utilizes acidic media to change the solubility behavior of metal solutes. The method can utilize Group 1 soluble alkali metals but can also be extended to any other soluble salts discussed under the solubility rules. The insoluble salts can be Group 2 alkaline earth metals or other insoluble salts. The insoluble adduct can have the designation XYZ where X is a soluble metal from a metal hydroxide or a metal oxide, Y is an insoluble metal from an insoluble metal hydroxide or an insoluble metal oxide, and Z is the acid ion from an aqueous acidic media.

21 Claims, 3 Drawing Sheets

METHOD FOR FORMING INSOLUBLE SOLUTE ADDUCTS USING AN ACIDIC MEDIUM

RELATED APPLICATIONS

This application claims the benefit, and priority benefit, of U.S. Provisional Patent Application Ser. No. 63/281,523, filed Nov. 19, 2021, the disclosure and contents of which are incorporated by reference herein in their entirety.

BACKGROUND

Field of the Invention

The presently disclosed subject matter relates to conversion of soluble metal into insoluble entities by adducting the soluble metal with insoluble metal in the presence of an aqueous acid media.

Description of the Related Art

Solubility is a substance's ability to be dissolved. The substance that is dissolving is called the solute. The substance it is dissolving is called a solvent. The solute usually is a solid and the solvent is usually a liquid. However, the solute can also be a gas, liquid or solid. As an example, in carbonated beverage drinks, the solute is a gas, and the solvent is a liquid. The solvent can be polar or nonpolar.

When a solute is mixed with a solvent, three outcomes can result.

First, the solute can dissolve up to a point before it starts to precipitate or does not dissolve at all.

Second, the solution during the dissolution is referred to as a dilute solution, and when the solute begins to show evidence of precipitation, it is referred to as a saturated solution.

Third, if the solute does not dissolve at fall, it is referred to as insoluble solute. The amount dissolved depends on the temperature and pressure of the solute-solvent system.

Improvements in this field are desired.

SUMMARY

In accordance with the presently disclosed subject matter, various illustrative embodiments of a method for forming an insoluble adduct using an acidic medium are described herein.

In certain illustrative embodiments, a method is provided for using acid media to create an insoluble adduct having the general designation XYZ, where X is a potassium from potassium hydroxide in Group 1 alkali metals, Y is a calcium from calcium hydroxide in Group 2 alkaline earth metal, and Z is an acid ion from aqueous phosphoric acid. The process can include intimately mixing the metal hydroxides or metal oxides in the presence of phosphoric acid media. An aqueous phase can be separated from the insoluble adduct to yield a dry insoluble K:Ca:Phosphate adduct.

In certain illustrative embodiments, a method is also provided for using acid media to create an insoluble adduct having the general designation XYZ, where X is a soluble potassium from potassium hydroxide in Group 1 alkali metals, Y is insoluble calcium from calcium hydroxide in Group 2 alkaline earth metal, and Z is an acid ion from 80% sulfuric acid. The process can include intimately mixing the metal hydroxides or metal oxides in the presence of the sulfuric acid media. An aqueous phase can be separated from the insoluble adduct to yield a dry insoluble K:Ca:Sulfate adduct.

In certain illustrative embodiments, a method is also provided for using acid media to create an insoluble adduct having the general designation XYZ, where X is a soluble sodium from sodium hydroxide in Group 1 alkali metals, Y is insoluble calcium from calcium hydroxide in Group 2 alkaline earth metal, and Z is an acid ion from 80% phosphoric acid. The process can include intimately mixing the metal hydroxides or metal oxides in the presence of the phosphoric acid media. An aqueous phase can be separated from the insoluble adduct to yield a dry insoluble Na:Ca:Phosphate adduct.

In certain illustrative embodiments, a method is also provided for using acid media to create an insoluble adduct having the general designation XYZ, where X is a soluble lithium from lithium hydroxide in Group 1 alkali metals, Y is insoluble calcium from calcium hydroxide in Group 2 alkaline earth metal, and Z is an acid ion from 80% phosphoric acid. The process can include intimately mixing the metal hydroxides or metal oxides in the presence of the phosphoric acid media. An aqueous phase can be separated from the insoluble adduct to yield a dry insoluble Li:Ca:Phosphate adduct.

In certain illustrative embodiments, a method is also provided for using acid media to create an insoluble adduct having the general designation XYZ, where X is a soluble potassium from potassium hydroxide in Group 1 alkali metals, Y is insoluble zirconium from zirconium hydroxide in Group 4, and Z is an acid ion from 80% phosphoric acid. The process can include intimately mixing the metal hydroxides or metal oxides in the presence of the phosphoric acid media. An aqueous phase can be separated from the insoluble adduct to yield a dry insoluble K:Zr:Phosphate adduct.

In certain illustrative embodiments, a method is also provided for using acid media to create an insoluble adduct having the general designation XYZ, where X is a soluble potassium from potassium hydroxide in Group 1 alkali metals, Y is insoluble zinc from zinc hydroxide in Group 12, and Z is an acid ion from aqueous phosphoric acid. The process can include intimately mixing the metal hydroxides or metal oxides in the presence of the phosphoric acid media. An aqueous phase can be separated from the insoluble adduct to yield a dry insoluble K:Zn:Phosphate adduct.

In certain illustrative embodiments, a method is also provided for using acid media to create an insoluble adduct having the general designation XYZ, where X is a soluble potassium from potassium hydroxide in Group 1 alkali metals, Y is insoluble bismuth from bismuth oxide in Group 15, and Z is an acid ion from 80% nitric acid. The process can include intimately mixing the metal hydroxides or metal oxides in the presence of the nitric acid media. An aqueous phase can be separated from the insoluble adduct to yield a dry insoluble K:(BiOH):Nitrate adduct.

In certain illustrative embodiments, a method is also provided for using aqueous acid media to create an insoluble adduct having the general designation XYZ. Starting with a soluble metal hydroxide or soluble metal oxide, where the metal in this soluble component is defined as X, and an insoluble metal hydroxide or insoluble metal oxide, where the metal in this insoluble component is defined as Y, and using an aqueous acidic media, where the acidic ion is defined as Z. By reacting the soluble component, the insoluble component, and the aqueous acidic media, an insoluble adduct, XYZ is formed. In addition to the adduct, water is also formed as a byproduct in the reaction wherein the water byproduct becomes a part of an aqueous phase. Where the aqueous phase comprises water byproduct, acidic media, and unadducted soluble components. Additionally, the aqueous phase is separated from the insoluble adduct to yield a dry insoluble adduct. The soluble component can be from any group of the periodic table. The insoluble component can be from any group of the periodic table. The acidic media can be any acid including but not limited to the following—phosphoric acid, sulfuric acid, nitric acid, hydrochloric acid, hydrobromic acid and hydroiodic acids. Acid concentration can vary from 1-100%. The processing temperature can vary from the freezing temperature to the boiling temperature of the solution of the acid used. Thus, the temperature will vary with the type of acid used as well as its concentration. The process can include intimately mixing the soluble and insoluble components in the presence of the aqueous acidic media, removing the water from the insoluble adduct, and heating the precipitated adduct to yield a dry insoluble XYZ adduct.

In certain illustrative embodiments, a method is also provided for forming an insoluble adduct. A soluble component from the group consisting of a soluble metal hydroxide and a soluble metal oxide is reacted with an insoluble component from the group consisting of an insoluble metal hydroxide and an insoluble metal oxide in the presence of an aqueous acidic media to form an insoluble precipitated adduct and a water byproduct wherein the water byproduct becomes a part of an aqueous phase. The aqueous phase contains the water byproduct, the acidic media, and the unadducted soluble component. The aqueous phase can be separated from the insoluble precipitated adduct to yield a dry insoluble adduct. The insoluble precipitated adduct has the general designation XYZ, wherein X is the metal in the soluble component, Y is the metal in the insoluble component, and Z is an acidic ion of the aqueous acidic media. Separating the insoluble precipitated adduct and the aqueous phase comprises drying the insoluble adduct. The metal in the soluble metal hydroxide comprises at least one of sodium, potassium, and lithium. The metal in the soluble metal hydroxide comprises a soluble metal. The metal in the soluble metal oxide comprises at least one of sodium, potassium, and lithium. The insoluble metal in the insoluble metal hydroxide comprises at least one of calcium, zirconium, and zinc. The metal in the insoluble metal hydroxide comprises an insoluble metal. The insoluble metal in the insoluble metal oxide comprises at least one of calcium, zirconium, and zinc. The acidic media comprises at least one of phosphoric acid, sulfuric acid, nitric acid, hydrochloric acid, hydrobromic acid and hydroiodic acids. The reacting occurs at a process temperature in the range from a freezing point to a boiling point of a solution of the acidic media.

In certain illustrative embodiments, a method is also provided for forming an insoluble K:Ca:Phosphate adduct using an aqueous acidic medium. A soluble component comprising potassium hydroxide is reacted with an insoluble component comprising calcium hydroxide in the presence of an aqueous phosphoric acid to form an insoluble adduct and a water byproduct. The water byproduct can become a part of an aqueous phase. The aqueous phase can be separated from the insoluble adduct to yield a dry insoluble adduct. The insoluble K:Ca:Phosphate adduct can have the general designation XYZ, wherein X is the potassium of the soluble component, Y is the calcium of the insoluble component, and Z is a phosphoric acid ion of the aqueous acidic media. The reacting of the soluble component with the insoluble component can include intimately mixing the soluble component and the insoluble component in presence of aqueous acidic media.

In certain illustrative embodiments, a method of forming an insoluble K:Ca:Sulfate adduct using an aqueous acidic medium. A soluble component comprising potassium hydroxide is reacted with an insoluble component comprising calcium hydroxide in the presence of a sulfuric acid ion from 80% sulfuric acid to form an insoluble adduct and a water byproduct. The water byproduct can become a part of an aqueous phase. The aqueous phase can be separated from the insoluble adduct to yield a dry insoluble K:Ca:Sulfate adduct. The insoluble K:Ca:Sulfate adduct can have the general designation XYZ, wherein X is the potassium of the soluble component, Y is the calcium in the insoluble component, and Z is a sulfuric acid ion of the acidic media. The separating of the insoluble precipitated K:Ca:Sulfate adduct and the water byproduct can include drying the insoluble precipitated K:Ca:Sulfate adduct to remove the water byproduct. The reacting of the soluble component with the insoluble component can include intimately mixing the soluble component and the insoluble component in presence of aqueous acidic media.

In certain illustrative embodiments, a method is also provided for forming an insoluble Na:Ca:Phosphate adduct using an aqueous acidic medium. A soluble component comprising sodium hydroxide is reacted with an insoluble component comprising calcium hydroxide in the presence of an aqueous phosphoric acid to form an insoluble adduct and a water byproduct. The water byproduct can become a part of an aqueous phase. The aqueous phase can be separated from the insoluble adduct to yield a dry insoluble adduct. The insoluble Na:Ca:Phosphate adduct can have the general designation XYZ, wherein X is the sodium of the soluble component, Y is the calcium of the insoluble component, and Z is a phosphoric acid ion of the aqueous acidic media. The reacting of the soluble component with the insoluble component can include intimately mixing the soluble component and the insoluble component in presence of aqueous acidic media.

In certain illustrative embodiments, a method is also provided for forming an insoluble K:BiOH:Nitrate adduct using an aqueous acidic media a soluble component comprising potassium hydroxide with an insoluble component comprising bismuth oxide in the presence of an aqueous nitric acid to form an insoluble precipitated adduct and a water byproduct. The water byproduct can become a part of an aqueous phase. The aqueous phase can be separated from the insoluble adduct to yield a dry insoluble adduct. The insoluble precipitated K:BiOH:Nitrate adduct can have the general designation XYZ, wherein X is the potassium of the soluble component, Y is the bismuth hydroxy of the insoluble component, and Z is nitric acid ion of the aqueous acidic media. The reacting of the soluble component with the insoluble component can include intimately mixing the soluble component and the insoluble component in presence of aqueous acidic media.

Figure 1:
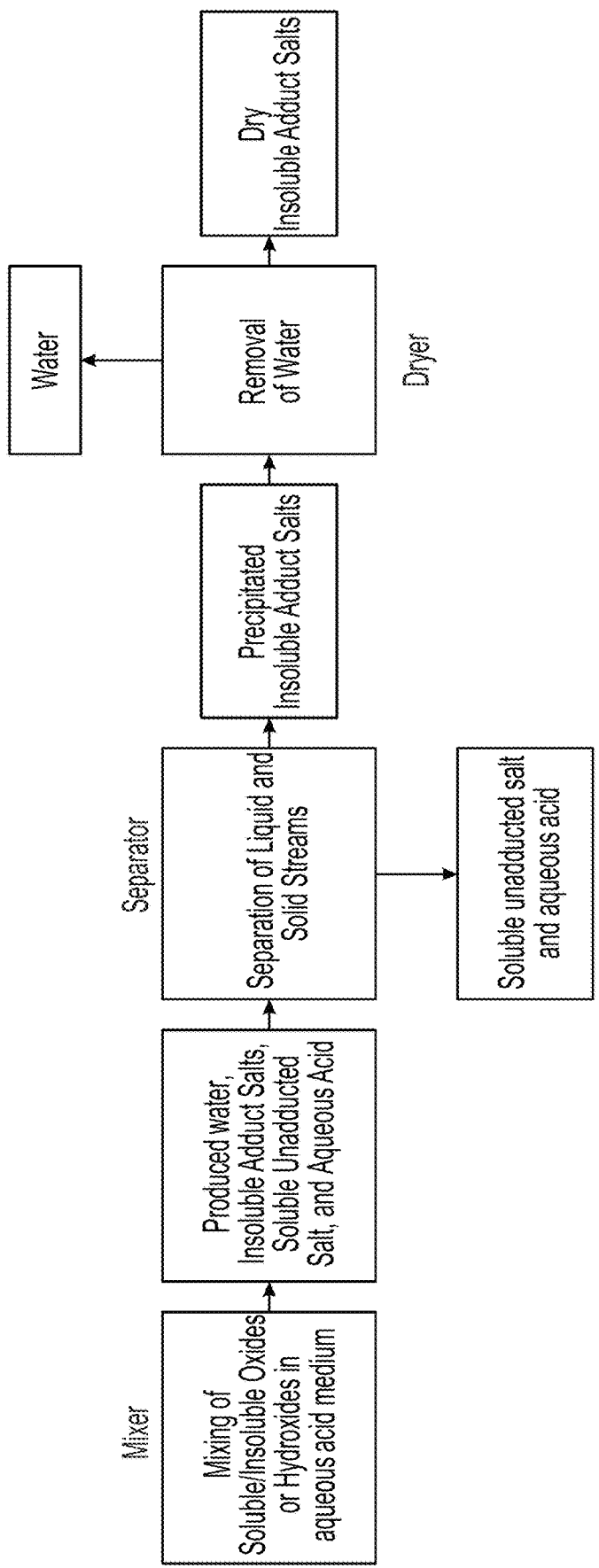
FIG. 1 is a process flow diagram for forming an insoluble adduct using an aqueous acidic medium according to embodiments of the presently disclosed subject matter.

While the presently disclosed subject matter will be described in connection with the preferred embodiment, it will be understood that it is not intended to limit the presently disclosed subject matter to that embodiment. On the contrary, it is intended to cover all alternatives, modifications, and equivalents, as may be included within the spirit and the scope of the presently disclosed subject matter as defined by the appended claims.

DETAILED DESCRIPTION

Various illustrative embodiments of a method for forming an insoluble adduct using an acidic medium are described herein.

Definition of Adducts and Salts

An adduct is a product of direct addition of two distinct molecules, resulting in a single reaction product containing all atoms of each component. Typically, these occur for organic molecules that contain double bonds or triple bonds. For example, ethylene to butene, acetylene to hexene, butene to octene and so on.

The presently disclosed subject matter discusses extending the adduction concept for inorganic molecules in the presence of aqueous acidic media, as such adducts cannot be made using mere physical mixing or blending. In certain illustrative embodiments, a slight deviation from the normal adduction chemistry is that all atoms of metal components are retained as salts of the aqueous acidic medium used. When starting with metal hydroxide or metal oxides and if phosphoric acid is used, the resulting adduct is a phosphate adduct. If sulfuric acid is used, the resulting adduct is a sulfate adduct. The resulting product is an insoluble adducted salt, where the salts can include phosphates, sulfates, nitrates, chlorides, fluorides, and the like. The metals in the insoluble adduct can be from any Groups in the Periodic Table.

Solubility Rules

Most of the precipitation reactions discussed involve aqueous salt solutions. As a reminder, salts are compounds which consist of metal cations like $Na^+$, $Ca^{2+}$, $Cu^{2+}$ (or the one nonmetal molecular ion discussed herein, ammonium —$NH_4^+$) ionically bonded to nonmetal anions such as Cl—, (including molecular anions such as hydroxide —$OH^-$, sulfate —$SO_4^{2-}$, phosphate —$PO_4^{3-}$, nitrate —$NO_3^-$, and carbonate —$CO_3^{2-}$), dissolved in water. Salts can be divided into two types: those soluble in water, and those insoluble in water. There are solubility rules which can be used to determine which salts are soluble in water.

Eleven (11) Solubility Rules have been developed to discuss the various aspects of the solubility behavior of ionic solid salts' ability to dissolve in water. These rules help when working on chemical reactions to determine the end states of substances involved.

The following describes the 11 Solubility Rules of salts and how to use them.

The rules on this list should be followed in order, because if a rule seems to contradict another rule, the rule that comes first is the one that should be followed. Substances on this list are given by their elemental names.

(1.) Salts containing Group I elements ($Li^+$, $Na^+$, $K^+$, $Cs^+$, $Rb^+$) are soluble. There are few exceptions to this rule. Salts containing the ammonium ion ($NH_4^+$) are also soluble.

(2.) Salts containing nitrate ion ($NO^{3-}$) are generally soluble.

(3.) Salts containing $Cl^-$, $Br^-$, or $I^-$ are generally soluble. Important exceptions to this rule are halide salts of $Ag^+$, $Pb^{2+}$, and $(Hg_2)^{2+}$. Thus, $AgCl$, $PbBr_2$, and $Hg_2Cl_2$ are insoluble.

(4.) Most silver salts are insoluble. $AgNO_3$ and $Ag(C_2H_3O_2)$ are common soluble salts of silver; virtually all others are insoluble.

(5.) Most sulfate salts are soluble. Important exceptions to this rule include $CaSO_4$, $BaSO_4$, $PbSO_4$, $Ag_2SO_4$ and $SrSO_4$.

(6.) Most hydroxide salts are only slightly soluble. Hydroxide salts of Group I elements are soluble. Hydroxide salts of Group II elements (Ca, Sr, and Ba) are slightly soluble. Hydroxide salts of transition metals and $Al^{3+}$ are insoluble. Thus, $Fe(OH)_3$, $Al(OH)_3$, and $Co(OH)_2$ are not soluble.

(7.) Most sulfides of transition metals are highly insoluble, including CdS, FeS, ZnS, and $Ag_2S$. Arsenic, antimony, bismuth, and lead sulfides are also insoluble.

(8.) Carbonates are frequently insoluble. Group II carbonates ($CaCO_3$, $SrCO_3$, and $BaCO_3$) are insoluble, as are $FeCO_3$ and $PbCO_3$.

(9.) Chromates are frequently insoluble. Examples include $PbCrO_4$ and $BaCrO_4$.

(10.) Phosphates such as $Ca_3(PO_4)_2$ and $Ag_3PO_4$ are frequently insoluble.

(11.) Fluorides such as $BaF_2$, $MgF_2$, and $PbF_2$ are frequently insoluble.

As one can observe, none of the rules discuss how to bring about a change in the behavior of the solutes, but only discuss the behavior of ionic metal salts. The salts discussed include chlorides, chlorates, nitrates, sulfates, hydroxides, sulfides, carbonates, chromates, phosphates and fluorides. The ionic metal salts include Group 1, Group 2, transition metals, precious metals essentially a gamma of metals from the periodic table.

Notably, 91 of the 118 elements shown above are metals.

Based on the solubility rules, not only are salts of alkali metals soluble in polar medium but the solubility aspect extends to a few other metals as well.

In certain illustrative embodiments, a chemical process is provided herein that uses an aqueous acidic media to change the solubility behavior of metal solutes. Such a process is not limited to Group 1 soluble alkali metals but can be extended to any other soluble salts discussed under the solubility rules. Likewise, the insoluble salts can be beyond Group 2 alkaline earth metals.

In certain illustrative embodiments, the insoluble adduct formed can be described according to the general designation XYZ where X is a soluble component from a metal hydroxide or a metal oxide, Y is an insoluble component from an insoluble metal hydroxide or an insoluble metal oxide, and Z is the acid ion from an aqueous acidic media. The insoluble adduct can be formed at any temperature and pressure where the solution remains a liquid. The adduction process locks in the soluble salt with the insoluble salt to create an insoluble adduct. In an illustrative embodiment, the insoluble adduct can be formed at temperatures ranging from 32° F. to up to 300° F. at atmospheric pressures. In yet another illustrative embodiment, the insoluble adduct can be formed at room temperature. Another range of temperatures could be from the freezing point of the solution up to the boiling point of the solution. As examples, potassium calcium phosphate, lithium calcium sulfate, potassium bismuth hydroxy nitrate, potassium zirconium phosphate, and potassium zinc phosphate are described here but the presently disclosed subject matter is not limited to these adducts. The produced insoluble adduct salts can be extracted through a separation and drying process. Methods of liquid-solid separation comprise filtration, evaporation, sedimentation, decantation, centrifugation, or other equivalent methods. The degree and speed of drying will depend on the temperature used to evaporate the solvent from the solution. Temperatures could range from the freezing point to the boiling point of the solution. In other illustrative embodiments, the temperature could vary from room temperature to 300° F. In other illustrative embodiments, the drying temperature could vary from room temperature to 600° F.

Depending upon the identity of the reactants that are used to form the resulting adduct reaction product having the general designation XYZ, a reaction product having the chemical formula ABC may result, wherein the terms A, B and/or C may have subscripts associated therewith, such as $A_e B_f C_g$. In this context, "e", "f", and "g" may each be a rational integer, as would be understood by one of ordinary skill in the art.

Experimental Testing

Physical mixing of a soluble hydroxide or a soluble oxide with an insoluble hydroxide or an insoluble oxide with water does not create any adduct.

Experiments were performed to support the presently disclosed subject matter.

Experimental details indicate how adducts are created:

(1.) "K:Ca:phosphate insoluble adduct" by intimately mixing potassium hydroxide with calcium hydroxide in the presence of aqueous phosphoric acid. (This produces a Group 1A:Group 2A:phosphate insoluble adduct).

(2.) "K:Ca:sulfate insoluble adduct" by intimately mixing potassium hydroxide with calcium hydroxide in the presence of aqueous sulfuric acid. (This produces a Group 1A:Group 2A:sulfate insoluble adduct).

(3.) "Na:Ca:phosphate insoluble adduct" by intimately mixing sodium hydroxide with calcium hydroxide in the presence of aqueous phosphoric acid. (This produces a Group 1A:Group 2A:phosphate insoluble adduct).

(4.) "Li:Ca:phosphate insoluble adduct" by intimately mixing lithium hydroxide with calcium hydroxide in the presence of aqueous phosphoric acid. (This produces a Group 1A:Group 2A:phosphate insoluble adduct).

(5.) "K:Zr:phosphate insoluble adduct" by intimately mixing potassium hydroxide with zirconium hydroxide in the presence of aqueous phosphoric acid. (This produces a Group 1A:Group 4:phosphate insoluble adduct).

(6.) "K:Zn:phosphate insoluble adduct" by intimately mixing zinc oxide with potassium hydroxide in the presence of aqueous phosphoric acid. (This produces a Group 1A:Group 12:phosphate insoluble adduct).

(7.) "K:(BiOH):Nitrate insoluble adduct" by intimately mixing potassium hydroxide with bismuth oxide in the presence of aqueous nitric acid. (This produces a Group 1A:Group 15:nitrate insoluble adduct).

Experiment—Physical Mixing Establishes that No Adducts are Formed

Soluble component from metal hydroxides or metal oxides in Group 1 were intimately and vigorously mixed with insoluble component from insoluble metal hydroxides or insoluble metal oxides in various Groups of the periodic table. The soluble component from metal hydroxide included potassium hydroxide, sodium hydroxide, lithium hydroxide and the non-soluble component from metal hydroxide included calcium hydroxide (Group 2), zirconium hydroxide (Group 4) and zinc hydroxide (Group 12).

Each of the mixed entities were tested for water solubility and results showed all of the soluble component for each of the mix dissolved completely showing no adduction occurred. Only the insoluble component that was used did not dissolve. This means that just by physical mixing of the soluble metal component with the insoluble metal component, they do not form an adduct. Instead, the soluble metal component that is used dissolves and the insoluble metal component that is used does not dissolve.

Experiment—Chemical Adduction Uses Acidic Medium

Step One: The Procedure can Include Intimately Mixing the Soluble Component with an Insoluble Component in the Presence of an Acidic Media.

Acids used for the above adduction for the present disclosed subject matter were phosphoric acid and sulfuric acid; but other acids, organic or inorganic, especially nitric acid, hydrochloric acid, hydroiodic acid, hydrobromic acid can be used.

For the experiments cited, the soluble and insoluble components used were intimately mixed with each of the acids cited at very high acid concentration. This resulted in the formation of a paste.

Post processing using two steps was performed in producing an insoluble adduct XYZ. First, a separation process using filtration was used to remove the byproduct water and excess acidic media. While this setup used a filter, one can achieve this operation using an evaporator, settling tank, decanter, and centrifuge or other equivalent devices. Second, drying of the mixed resulting precipitated solids to drying temperature resulted in producing an insoluble adduct XYZ.

The following XYZ adducts were manufactured using the above procedure:

(i) K:Ca:Phosphate; (ii) K:Ca:Sulfate; (iii) Na:Ca:Phosphate; (iv) Li:Ca:Phosphate; (v) K:Zr:Phosphate; (vi) K:Zn:Phosphate; and (vii) K:(BiOH):Nitrate Step Two: Calculating Amount of Soluble Adduct by the Insoluble Adduct The starting soluble and insoluble hydroxides or oxides each have a molecular weight based on their chemical formula. The mass of the compounds used in the experiments are shown in the right-hand columns of Table 1A-1G below:

Summary Tables for Adduct Formation Experiments

TABLE 1-A

| Table 1-A: Potassium Calcium Phosphate Adduct Experiment #1: Potassium Calcium Phosphate Adduct (K:Ca:PO$_4$ Adduct) | |
|---|---|
| Actual Raw Material weights used | |
| Potassium hydroxide, grams | 63.44 |
| Calcium hydroxide, grams | 15.5 |
| 80% Phosphoric Acid, grams | 62.00 |
| Calculated weight of Salts if no adduction occurs | |
| Potassium Phosphate (soluble), grams | 80.00 |
| Calcium Phosphate (insoluble), grams | 21.65 |
| Actual results of experiment indicate additional mass of insoluble salt due to adduction | |
| Weight of insoluble potassium calcium phosphate salt adduct, grams | 97.58 |
| Resulting additional insoluble weight, grams | 75.93 |
| Ratio of potassium phosphate/potassium calcium phosphate adduct | 0.78 |

Table 1-A. The experiment shows an increase of 75.93 grams of insoluble salt over what was originally expected to be insoluble, which would have been 21.65 grams of Calcium Phosphate. The experiment yielded 97.58 grams of total insoluble salt adduct. Hence, it is concluded the additional weight has come from Potassium Phosphate which has been rendered insoluble due to adduction with Calcium Phosphate to form a Potassium Calcium Phosphate adduct.

TABLE 1-B

Table 1-B: Potassium Calcium Sulfate Adduct
Experiment #2: Potassium Calcium
Sulfate Adduct (K:Ca:SO$_4$ Adduct)

| Actual Raw Material weights used | |
|---|---|
| Potassium hydroxide, grams | 54.73 |
| Calcium hydroxide, grams | 8.15 |
| 80% Sulfuric Acid, grams | 72.90 |
| Calculated weight of Salts if no adduction occurs | |
| Potassium Sulfate (soluble), grams | 84.98 |
| Calcium Sulfate (insoluble, grams | 14.99 |
| Actual results of experiment indicate additional mass of insoluble salt due to adduction | |
| Weight of insoluble potassium calcium sulfate adduct, grams | 97.66 |
| Resulting additional insoluble weight, grams | 82.67 |
| Ratio of potassium sulfate/potassium calcium sulfate adduct | 0.85 |

Table 1-B. The experiment shows an increase of 82.67 grams of insoluble salt over what was originally expected to be insoluble, which would have been 14.99 grams of Calcium Sulfate. The experiment yielded 97.66 grams of total insoluble salt adduct. Hence, it is concluded the additional weight has come from Potassium Sulfate which has been rendered insoluble due to adduction with Calcium Sulfate to form a Potassium Calcium Sulfate adduct.

TABLE 1-C

Table 1-C: Sodium Calcium Phosphate Adduct
Experiment #3: Sodium Calcium
Phosphate Adduct (Na:Ca:PO$_4$ Adduct)

| Actual Raw Material weight used | |
|---|---|
| Sodium hydroxide, grams | 55.12 |
| Calcium hydroxide, grams | 17.90 |
| 80% Phosphoric Acid, grams | 75.74 |
| Calculated weight of Salts if no adduction occurs | |
| Sodium Phosphate (soluble), grams | 75.30 |
| Calcium Phosphate (insoluble), grams | 25.01 |
| Actual results of experiment indicate additional mass of insoluble salt due to adduction | |
| Weight of insoluble sodium calcium phosphate adduct, grams | 98.88 |
| Resulting additional insoluble weight, grams | 73.87 |
| Ratio of sodium phosphate/sodium calcium phosphate adduct | 0.75 |

Table 1-C. The experiment shows an increase of 73.87 grams of insoluble salt over what was originally expected to be insoluble, which would have been 25.01 grams of Calcium Phosphate. The experiment yielded 98.88 grams of total insoluble salt adduct. Hence, it is concluded the additional weight has come from Sodium Phosphate which has been rendered insoluble due to adduction with Calcium Phosphate to form a Sodium Calcium Phosphate adduct.

TABLE 1-D

Table 1-D: Lithium Calcium Phosphate Adduct
Experiment #4: Lithium Calcium
Phosphate Adduct (Li:Ca:PO$_4$ Adduct)

| Actual Raw Material weight used | |
|---|---|
| Lithium hydroxide, grams | 46.5 |
| Calcium hydroxide, grams | 17.9 |
| 80% Phosphoric Acid, grams | 99.00 |
| Calculated weight of Salts if no adduction occurs | |
| Lithium Phosphate (soluble), grams | 74.93 |
| Calcium Phosphate (insoluble), grams | 25.01 |
| Actual results of experiment indicate additional mass of insoluble salt due to adduction | |
| Weight of insoluble lithium calcium phosphate adduct, grams | 95.67 |
| Resulting additional insoluble weight, grams | 70.66 |
| Ratio of lithium phosphate/lithium calcium phosphate adduct | 0.74 |

Table 1-D. The experiment shows an increase of 70.66 grams of insoluble salt over what was originally expected to be insoluble, which would have been 25.01 grams of Calcium Phosphate. The experiment yielded 95.67 grams of total insoluble salt adduct. Hence, it is concluded the additional weight has come from Lithium Phosphate which has been rendered insoluble due to adduction with Calcium Phosphate to form a Lithium Calcium Phosphate adduct.

TABLE 1-E

Table 1-E: Potassium Zirconium Phosphate Adduct
Experiment #5: Potassium Zirconium
Phosphate Adduct (K:Zr:PO$_4$ Adduct)

| Actual Raw Material weights used | |
|---|---|
| Potassium hydroxide, grams | 63.55 |
| Zirconium hydroxide, grams | 12.8 |
| 80% Phosphoric Acid, grams | 60.50 |
| Calculated weight of Salts if no adduction occurs | |
| Potassium Phosphate (soluble), grams | 80.13 |
| Zirconium Phosphate (insoluble), grams | 20.13 |
| Actual results of experiment indicate additional mass of insoluble salt due to adduction | |
| Weight of insoluble potassium zirconium phosphate adduct, grams | 92.38 |
| Resulting additional insoluble weight, grams | 72.25 |
| Ratio of potassium phosphate/potassium zirconium phosphate adduct | 0.78 |

Table 1-E. The experiment shows an increase of 72.25 grams of insoluble salt over what was originally expected to be insoluble, which would have been 20.13 grams of Zirconium Phosphate. The experiment yielded 92.38 grams of total insoluble salt adduct. Hence, it is concluded the additional weight has come from Potassium Phosphate which has been rendered insoluble due to adduction with Zirconium Phosphate to form a Potassium Zirconium Phosphate adduct.

TABLE 1-F

Table 1-F: Potassium Zinc Phosphate Adduct
Experiment #6: Potassium Zinc
Phosphate Adduct (K:Zn:PO$_4$ Adduct)

| Actual Raw Material weights used | |
|---|---|
| Potassium hydroxide, grams | 47.56 |
| Zinc hydroxide, grams | 25.29 |
| 80% Phosphoric Acid, grams | 59.95 |

TABLE 1-F-continued

Table 1-F: Potassium Zinc Phosphate Adduct
Experiment #6: Potassium Zinc
Phosphate Adduct (K:Zn:PO$_4$ Adduct)

| Calculated weight of Salts if no adduction occurs | |
|---|---|
| Potassium Phosphate (soluble), grams | 59.97 |
| Zinc Phosphate (insoluble), grams | 39.99 |
| Actual results of experiment indicate additional mass of insoluble salt due to adduction | |
| Weight of insoluble potassium zinc phosphate adduct, grams | 88.50 |
| Resulting additional insoluble weight, grams | 48.51 |
| Ratio of potassium phosphate/potassium zinc phosphate adduct | 0.55 |

Table 1-F. The experiment shows an increase of 48.51 grams of insoluble salt over what was originally expected to be insoluble, which would have been 39.99 grams of Zinc Phosphate. The experiment yielded 88.50 grams of total insoluble salt adduct. Hence, it is concluded the additional weight has come from Potassium Phosphate which has been rendered insoluble due to adduction with Zinc Phosphate to form a Potassium Zinc Phosphate adduct.

TABLE 1-G

Table 1-G: Potassium Bismuth Hydroxy Nitrate Adduct
Experiment #7: Potassium Bismuth Hydroxy
Nitrate Adduct (K:BiOH:Nitrate Adduct)

| Actual Raw Material weights used | |
|---|---|
| Bismuth Oxide, grams | 17.69 |
| Potassium Hydroxide, grams | 38.89 |
| 70% Nitric Acid, grams | 91.17 |
| Calculated weight of Salts if no adduction occurs | |
| Potassium Nitrate (soluble), grams | 70.07 |
| Bismuth Hydroxy Nitrate (insoluble), grams | 55.50 |
| Actual results of experiment indicate additional mass of insoluble salt due to adduction | |
| Weight of insoluble potassium bismuth hydroxy nitrate adduct, grams | 90.17 |
| Resulting additional insoluble weight, grams | 34.67 |
| Ratio of potassium nitrate/potassium bismuth hydroxy nitrate adduct | 0.38 |

Table 1-G. The experiment shows an increase of 34.67 grams of insoluble salt over what was originally expected to be insoluble, which would have been 55.50 grams of Bismuth Hydroxy Nitrate. The experiment yielded 90.17 grams of total insoluble salt adduct. Hence, it is concluded the additional weight has come from Potassium Nitrate which has been rendered insoluble due to adduction with Bismuth Hydroxy Nitrate to form a Potassium Bismuth Hydroxy Nitrate adduct.

These soluble metal hydroxides or soluble metal oxides were reacted with insoluble metal hydroxides or insoluble metal oxides in aqueous acidic medias such as nitric acid, phosphoric acid or sulfuric acid to form insoluble phosphate adducts or insoluble sulfate adducts. In addition to the insoluble adduct formation, water was also generated in the adduction process. The produced water mixes with the aqueous acidic media. In summary, upon the completion of the adduction, the aqueous phase contains the produced water, unadducted soluble salts, and excess aqueous acid.

The molecular weights of the theoretical soluble salt and theoretical insoluble salt are different from the resulting insoluble adducts.

If no adduction occurred, the soluble metal hydroxides or soluble metal oxides would dissolve completely leaving the insoluble metal hydroxides or insoluble metal oxides to precipitate.

For example, potassium hydroxide would be converted to potassium phosphate and calcium hydroxide would be converted to calcium phosphate. If no adduction occurred, all of the potassium phosphate would dissolve in water and only calcium phosphate would precipitate. But, if the precipitated amount is higher than the calcium phosphate amount, that excess is due to the adduction of potassium with the calcium. That excess amount divided by the total weight of the adduct is the percentage of soluble metal salt adducted.

Table 1A-1G summarizes the results for each of the adducts described above.

These experiments were performed to validate the formation of adducts and one skilled in the art can modify the weights of adducts formed by varying processing conditions.

Step Three: Solubility of Adducts 10 grams of the insoluble adducts were mixed well with 300 ml water for 15 minutes. The precipitated material was filtered and dried at 300° F. and reweighed. The results showed no material loss, confirming that the adduct manufactured is indeed 100% insoluble.

Figure 2:
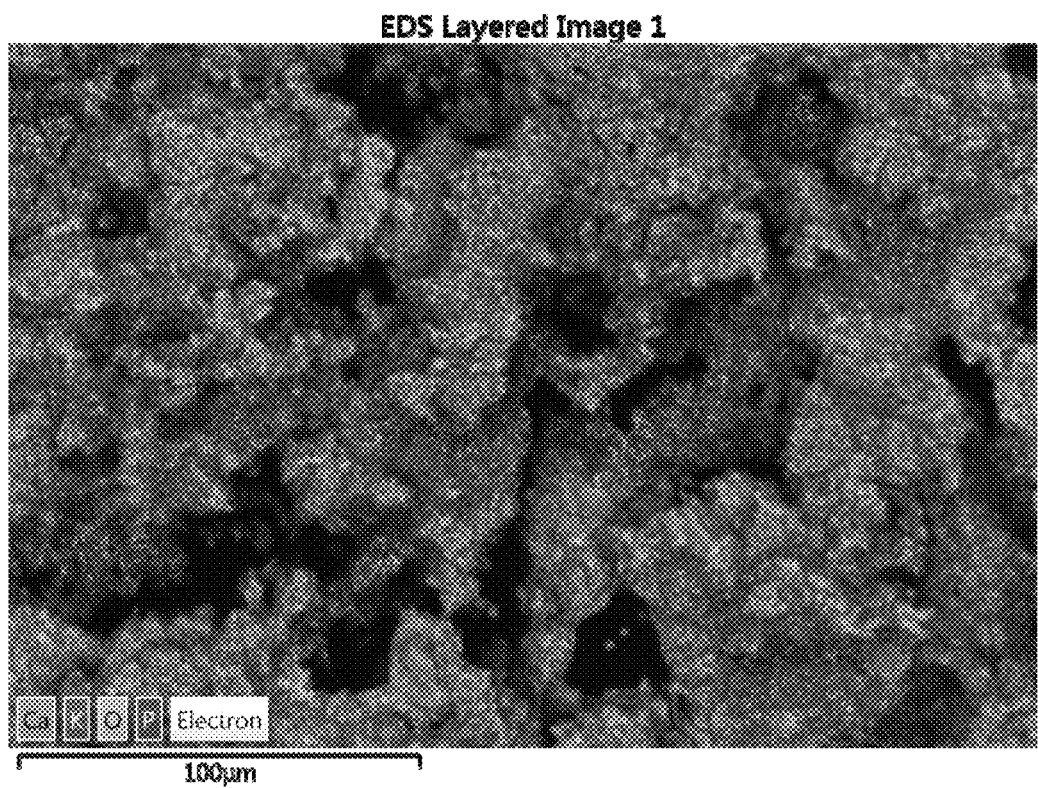
FIG. 2 is an image of SEM (Scanning Electron Microscope) with EDS (Energy Dispersive Spectroscopy) results overlayed, identifying the morphology of the insoluble potassium calcium phosphate adduct according to embodiments of the presently disclosed subject matter.
Figure 3:
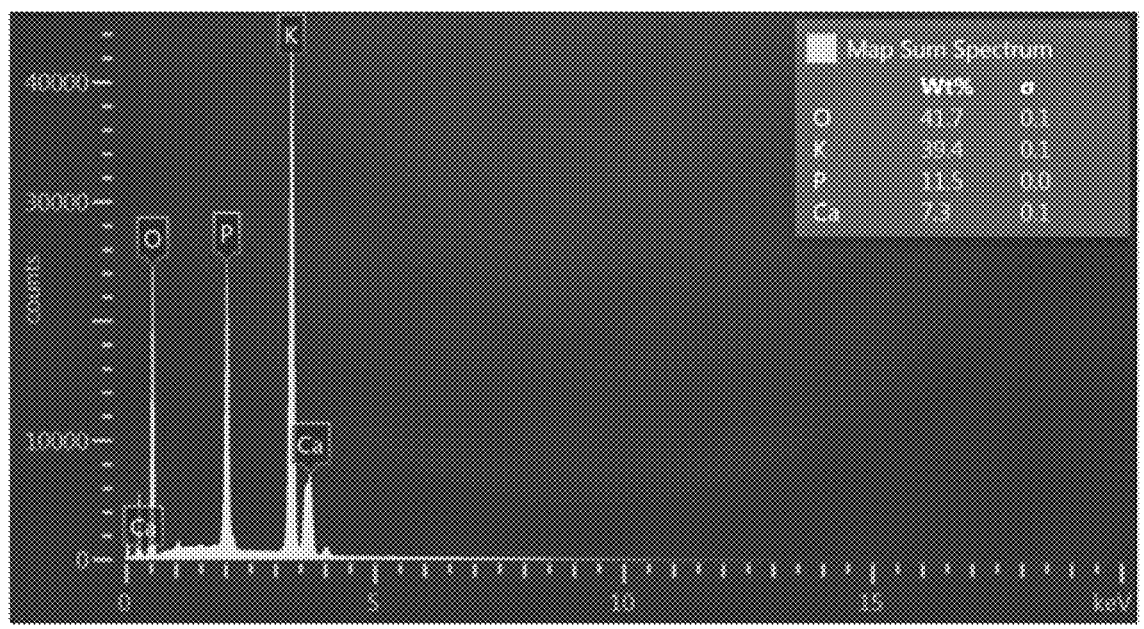
FIG. 3 is an image of EDS (Energy Dispersive Spectroscopy) results according to embodiments of the presently disclosed subject matter.

Additionally melting point, density, and a combined SEM (Scanning Electron Microscope) and EDS (Energy Dispersive Spectroscopy) were all performed to verify the elemental composition of the adducts formed. Referring to FIG. 2 herein, the EDS layered SEM image depicts the resultant potassium calcium phosphate adduct formed by the embodiments described. FIG. 2 illustrates that potassium, calcium, and phosphate are integrated into an amorphous matrix to form an insoluble adduct. There are areas with varying degrees of homogeneity. The image depicts a mostly homogeneous mix of potassium, calcium, and phosphate which would be expected of an insoluble adduct which consists of these components. Referring to FIG. 3 herein, the EDS depicts the spectra associate with calcium, potassium, phosphorous, and oxygen which is the elemental composition of the insoluble potassium calcium phosphate adduct. This SEM image in FIG. 3 herein is the 10 gram sample retained from the water solubility test described above.

The melting point, the density, and the solubility of the theoretical soluble salt and the theoretical insoluble salt are different from the resulting insoluble adducts. The combination of the amorphous homogeneity of the SEM-EDS results, the resultant insolubility of the adducts, the different melting points of the adducts, and the different densities of adducts all indicate that the resultant adduct is a different mixture than a simple combination of the two expected theoretical salts.

Melting point of adduct: The adduct formed exhibits a melting point different than that of the individual corresponding salts. Table 2 herein illustrates the same.

TABLE 2

| Melting Point Comparison | |
|---|---|
| Compound Name | Melting Point, degrees Celsius |
| Zirconium Phosphate Tribasic | 158 |
| Potassium Phosphate Tribasic | 1380 |
| Potassium Zirconium Phosphate adduct salt | 950 |
| Potassium Nitrate | 334 |
| Bismuth Nitrate | 30 |

TABLE 2-continued

Melting Point Comparison

| Compound Name | Melting Point, degrees Celsius |
|---|---|
| Potassium Bismuth hydroxy nitrate adduct salt | 300 |

Density of adduct: The adduct formed exhibits a density different than the density of the two individual corresponding salts. Table 3 herein illustrates the same.

TABLE 3

Density Comparison

| Compound Name | Density, g/cm$^3$ |
|---|---|
| Potassium Phosphate Tribasic | 2.56 |
| Calcium Phosphate Tribasic | 3.14 |
| Potassium Calcium Phosphate adduct salt | 2.68 |
| Potassium Nitrate | 2.11 |
| Bismuth Hydroxide Nitrate | 6.04 |
| Potassium Bismuth hydroxy nitrate adduct salt | 4.39 |

Bismuth Oxide reaction chemistry with nitric acid is very complex, as many variations of nitrate salts exist. Based on density measurements, the adduct formed during this experiment is Bismuth Hydroxy Nitrate, with a molecular weight of 1461.98.

To the extent used herein, the phrase "at least one of" preceding a series of items, with the terms "and" or "or" to separate any of the items, modifies the list as a whole, rather than each member of the list (i.e., each item). The phrase "at least one of" allows a meaning that includes at least one of any one of the items, and/or at least one of any combination of the items, and/or at least one of each of the items. By way of example, the phrases "at least one of A, B, and C" or "at least one of A, B, or C" each refer to only A, only B, or only C; any combination of A, B, and C; and/or at least one of each of A, B, and C. As used herein, the term "A and/or B" means embodiments having element A alone, element B alone, or elements A and B taken together.

While the disclosed subject matter has been described in detail in connection with a number of embodiments, it is not limited to such disclosed embodiments. Rather, the disclosed subject matter can be modified to incorporate any number of variations, alterations, substitutions or equivalent arrangements not heretofore described, but which are commensurate with the scope of the disclosed subject matter.

Additionally, while various embodiments of the disclosed subject matter have been described, it is to be understood that aspects of the disclosed subject matter may include only some of the described embodiments. Accordingly, the disclosed subject matter is not to be seen as limited by the foregoing description, but is only limited by the scope of the claims.

What is claimed is:

1. A method of forming an insoluble adduct, the method comprising:
reacting a soluble metal hydroxide with an insoluble metal hydroxide in the presence of an aqueous acidic media to form an insoluble adduct and a water byproduct, wherein the metal in the soluble metal hydroxide comprises at least one of potassium and lithium, and wherein the metal in the insoluble metal hydroxide comprises at least one of zirconium and zinc.

2. The method of claim 1, wherein the water byproduct becomes a part of an aqueous phase and further comprising separating the aqueous phase from the insoluble adduct to yield a dry insoluble adduct.

3. The method of claim 1, wherein the insoluble adduct is precipitated and has the general designation XYZ, wherein X is the metal in the soluble component, Y is the metal in the insoluble component, and Z is an acidic ion of the aqueous acidic media.

4. The method of claim 1, wherein the acidic media comprises at least one of phosphoric acid, sulfuric acid, nitric acid, hydrochloric acid, hydrobromic acid and hydroiodic acids.

5. The method of claim 1, wherein the reaction occurs at a process temperature in the range from a freezing point to a boiling point of a solution of the acidic media.

6. A method of forming an insoluble K:Ca:Phosphate adduct using an aqueous acidic medium, the method comprising:
reacting a soluble component comprising potassium hydroxide with an insoluble component comprising calcium hydroxide in the presence of an aqueous phosphoric acid to form the insoluble K:Ca:Phosphate adduct and a water byproduct.

7. The method of claim 6, wherein the water byproduct becomes a part of an aqueous phase and further comprising separating the aqueous phase from the insoluble adduct to yield a dry insoluble adduct.

8. The method of claim 6, wherein the insoluble K:Ca:Phosphate adduct has the general designation XYZ, wherein X is the potassium of the soluble component, Y is the calcium of the insoluble component, and Z is a phosphoric acid ion of the aqueous acidic media.

9. The method of claim 6, wherein the reacting of the soluble component with the insoluble component comprises intimately mixing the soluble component and the insoluble component in presence of the aqueous acidic media.

10. A method of forming an insoluble K:Ca:Sulfate adduct using an aqueous acidic medium, the method comprising:
reacting a soluble component comprising potassium hydroxide with an insoluble component comprising calcium hydroxide in the presence of an aqueous sulfuric acid to form the insoluble K:Ca:Sulfate adduct and a water byproduct.

11. The method of claim 10, wherein the water byproduct becomes a part of an aqueous phase and further comprising separating the aqueous phase from the insoluble adduct to yield a dry insoluble adduct.

12. The method of claim 10, wherein the insoluble K:Ca:Sulfate adduct has the general designation XYZ, wherein X is the potassium of the soluble component, Y is the calcium of the insoluble component, and Z is a sulfuric acid ion of the aqueous acidic media.

13. The method of claim 10, wherein the reacting of the soluble component with the insoluble component comprises intimately mixing the soluble component and the insoluble component in the presence of an aqueous acidic media.

14. A method of forming an insoluble adduct, the method comprising:
reacting a soluble metal hydroxide or a soluble metal oxide with an insoluble metal hydroxide in the presence of an aqueous acidic media to form an insoluble adduct and a water byproduct.

15. The method of claim 14, wherein the soluble metal oxide comprises potassium.

16. The method of claim 14, wherein the soluble metal oxide comprises lithium.

17. The method of claim 14, wherein the soluble metal oxide comprises sodium.

18. The method of claim 14, wherein the soluble metal hydroxide comprises potassium.

19. The method of claim 14, wherein the soluble metal hydroxide comprises lithium.

20. The method of claim 14, wherein the insoluble metal hydroxide comprises zirconium.

21. The method of claim 14, wherein the insoluble metal hydroxide comprises zinc.

* * * * *